No. 844,252. PATENTED FEB. 12, 1907.
R. F. CORDERO.
DRIER.
APPLICATION FILED JULY 3, 1906.

WITNESSES:

INVENTOR
Ramon F. Cordero
BY
ATTORNEYS

No. 844,252. PATENTED FEB. 12, 1907.
R. F. CORDERO.
DRIER.
APPLICATION FILED JULY 3, 1906.

WITNESSES:

INVENTOR
Ramon F. Cordero
BY
ATTORNEYS

No. 844,252. PATENTED FEB. 12, 1907.
R. F. CORDERO.
DRIER.
APPLICATION FILED JULY 3, 1906.

WITNESSES:

INVENTOR
Ramon F. Cordero
BY
ATTORNEYS

No. 844,252.

PATENTED FEB. 12, 1907.

R. F. CORDERO.
DRIER.
APPLICATION FILED JULY 3, 1906.

WITNESSES:

INVENTOR
Ramon F. Cordero
BY
ATTORNEYS

No. 844,252.   PATENTED FEB. 12, 1907.
R. F. CORDERO.
DRIER.
APPLICATION FILED JULY 3, 1906.

WITNESSES:

INVENTOR
Ramon F. Cordero
BY
ATTORNEYS

No. 844,252. PATENTED FEB. 12, 1907.
R. F. CORDERO.
DRIER.
APPLICATION FILED JULY 3, 1906.

WITNESSES:

INVENTOR
Ramon F. Cordero
BY Munn & Co
ATTORNEYS

UNITED STATES PATENT OFFICE.

RAMÓN F. CORDERO, OF RUBIO, VENEZUELA.

DRIER.

No. 844,252.     Specification of Letters Patent.     Patented Feb. 12, 1907.

Application filed July 3, 1906. Serial No. 324,605.

*To all whom it may concern:*

Be it known that I, RAMÓN F. CORDERO, a citizen of the Republic of Venezuela, and a resident of Rubio, in the State of Tachira, Venezuela, have invented a new and Improved Drier, of which the following is a full, clear, and exact description.

This invention relates to improvements in driers for coffee, cereals, fruit, &c., an object being to provide a device by means of which the material may be rapidly and thoroughly dried.

I will describe a drier embodying my invention and then point out the novel features in the appended claims.

Reference is to be had to the accompanying drawings, forming a part of this specification, in which similar characters of reference indicate corresponding parts in all the figures.

Fig. 15 is a sectional elevation showing the device as arranged for drying fruit or the like.

In the drawings I have shown two driers A B, arranged side by side. It is to be understood, however, that in practice a greater number may be employed. Each section comprises a casing having side walls 10 11 and end walls 12 13. The front end wall 12 of each section is provided with a door 14, so that the fruit-supporting shelving may be placed therein, as will be hereinafter described.

Arranged inward of the wall 10 and spaced therefrom is a perforated wall 15, and inward of the wall 15 and spaced therefrom is a perforated wall 16. At the opposite side are similarly-perforated walls 17 18. The coffee or other material to be dried is to pass downward between these perforated walls, as will be hereinafter described, and in the passage between said walls the material will be met by a circulation of air heated to a suitable degree. The perforated walls 15 and 17 are supported by strips 19, attached to the outer walls 10 11, so as to stiffen the said perforated walls and prevent their warping under heat. It may be here stated that these perforated walls may consist of wire-cloth.

Inward of the walls 16 18 are plates 20, consisting of iron or other suitable material, and these plates 20 are held removably in place by means of hooks or clips 21, attached to bars 22 and extended over the upper edges of said plates, while the lower edges of the plates engage with clips 23, attached to bars 24. These plates 20 are designed to prevent the passage of hot air to the middle portion of the drier-section when the drier is used for coffee, cereals, or the like.

In the upper portion of each section are deflectors 25 26 for directing coffee or the like to the space between the perforated walls, and the material is directed to these deflectors of opposite sections of the drier by means of swinging deflector-boards 27, which are adjusted as to their angle by means of screws 28. The said boards 27 are hinged to inclined boards 29, onto which the material is discharged from a tube comprising a semicircular fixed section 30 and a semicircular section 31, designed to have a rotary motion.

At one end of the feeding device is a hopper 32, having an outlet 33 at one side, which is closed at a certain time by the end wall of the rotary section 31. To permit of an easy movement of this rotary section, it is arranged to operate on rollers 34, mounted in segmental tracks 35. At intervals cords or cables 36 are attached to the rotary portion of the feeder-pipe. These cables extend over pulleys 37 at one side of the frames 38 and connect with weights 39, and at the other side the said cords or cables extend over pulleys 40 and connect with weights 41. A spiral feeder 42 extends through the feeder pipe or tube, and on the rear end of the shaft thereof is a band-wheel 43, driven from a pulley 44 on the shaft of the driving-wheel 45. This band-wheel 43 is provided with a tooth 46, designed to engage with a toothed wheel 47 to impart a step-by-step rotary movement thereto. The shaft 48, to which this toothed wheel 47 is attached, extends lengthwise of the drier, and it is provided with fingers 49, designed to engage with the weights 41, raising said weights and permitting the weights 39 to rotate the section 31 of the feeder, thus causing an opening between the lower edge of said rotary section 31 and the fixed part or feeder 42, whereby the coffee or other material will fall upon the boards 29.

Figures 9, 10, 11:
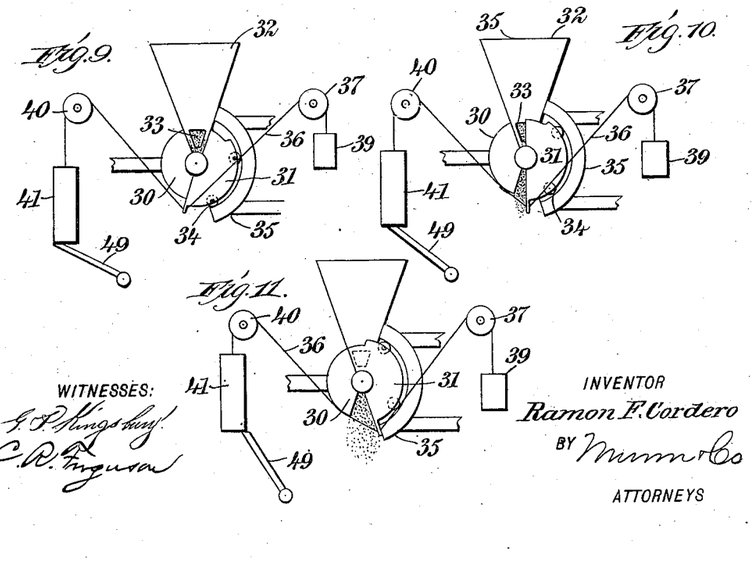
Figs. 9, 10, and 11 are detail views showing the different positions of a feeder employed.
Figure 12:
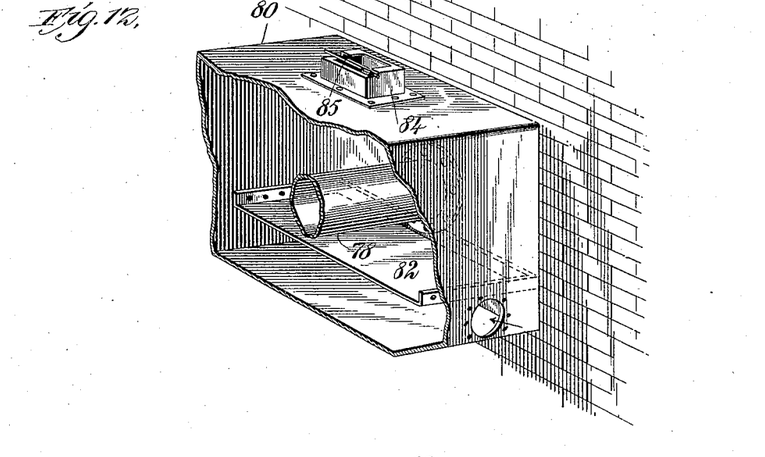
Figs. 12, 13, and 14 are detail views showing the air-distributing pipes employed.
Figure 13:
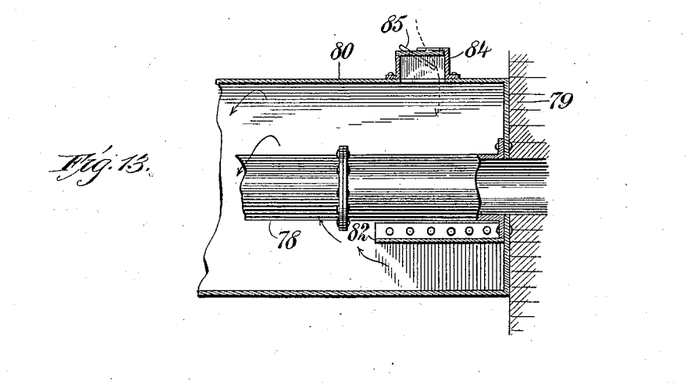
Figure 14:
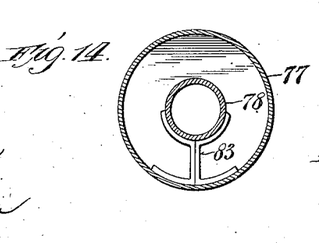

In Fig. 9 the parts are shown in a position for discharging the coffee or other material into the tube.

Fig. 10 shows the rotary part as moved to one-half of its movement, and Fig. 11 shows the said part as wholly moved, closing the outlet 33 and causing an opening for the discharge of material.

Figure 1:
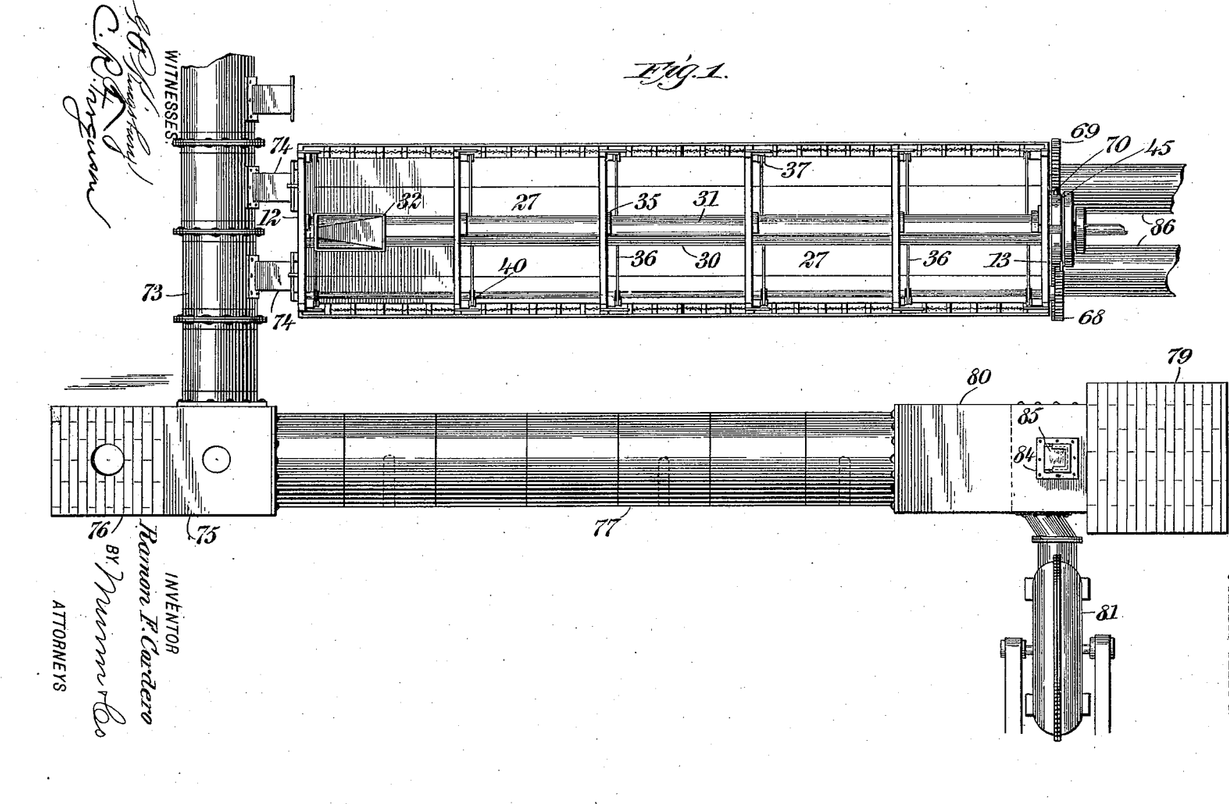
Figure 1 is a plan view of a drier embodying my invention.
Figure 2:
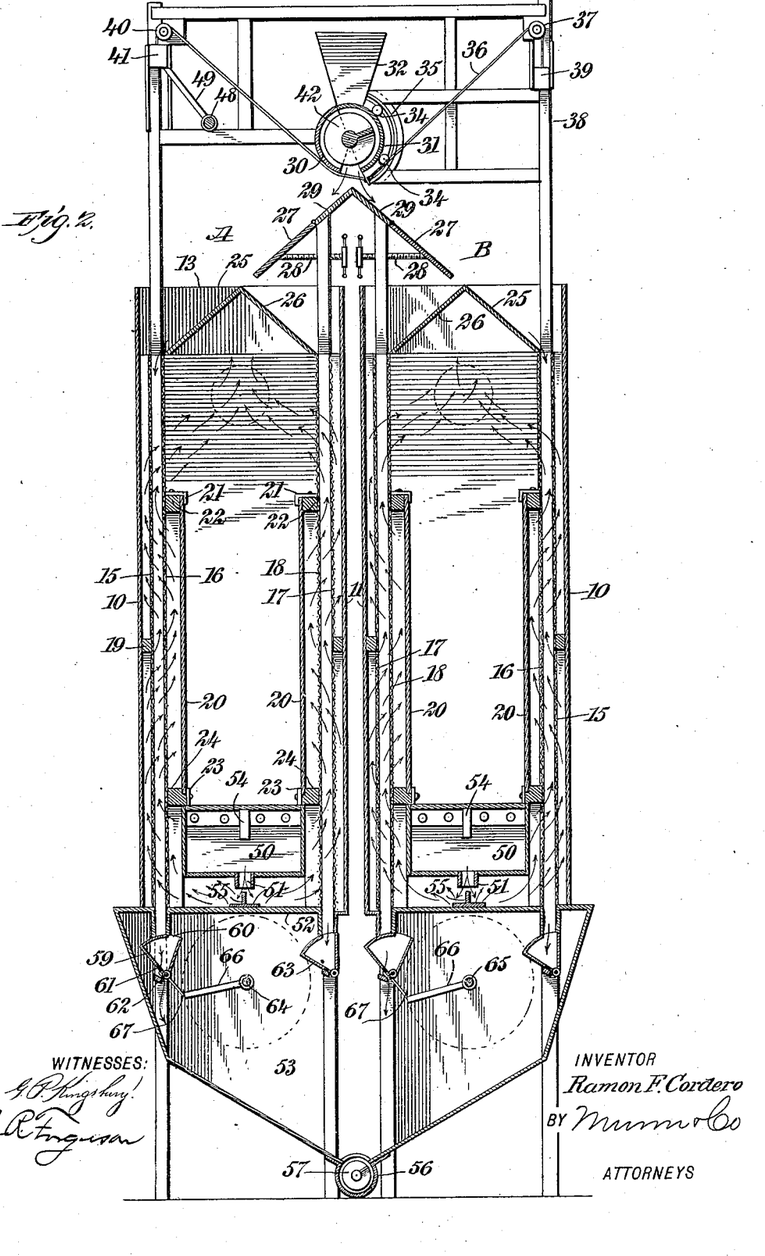
Fig. 2 is a sectional elevation thereof.
Figure 3:
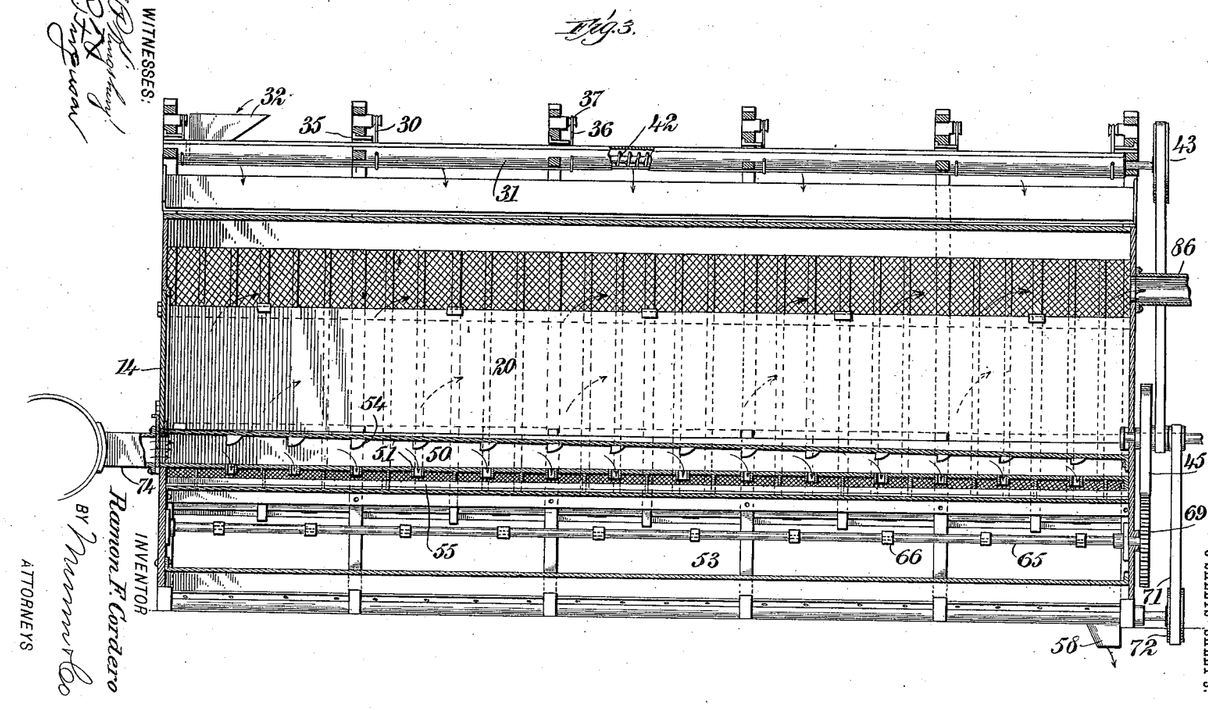
Fig. 3 is a longitudinal section.
Figure 4:
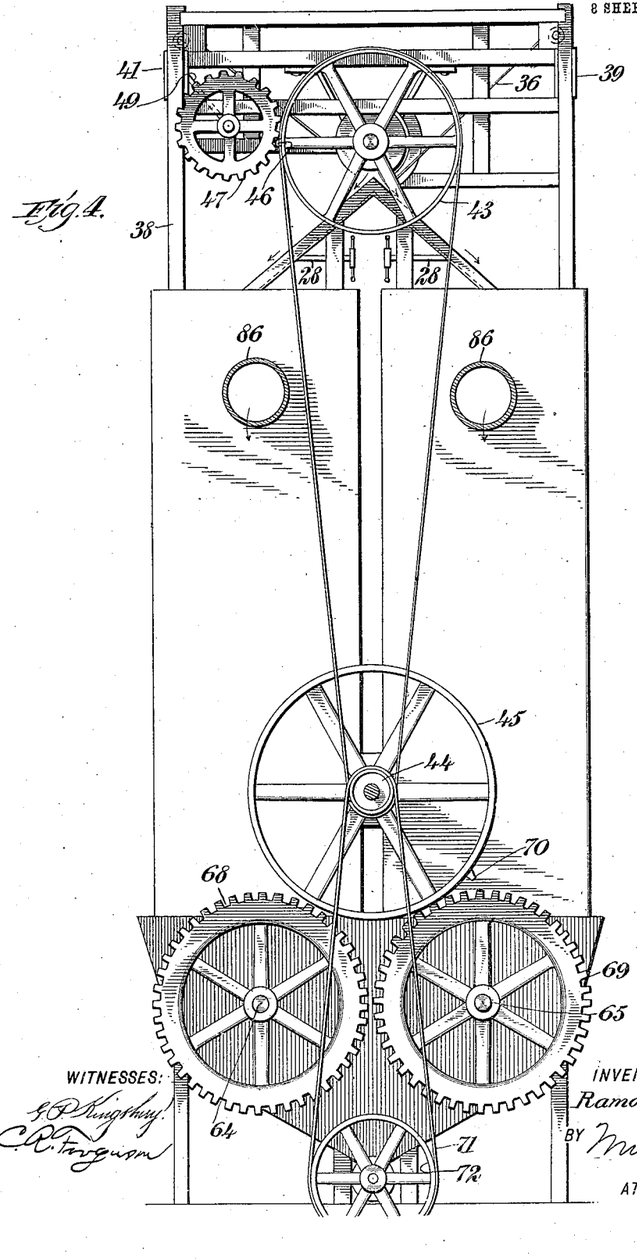
Fig. 4 is an end elevation.
Figure 5:
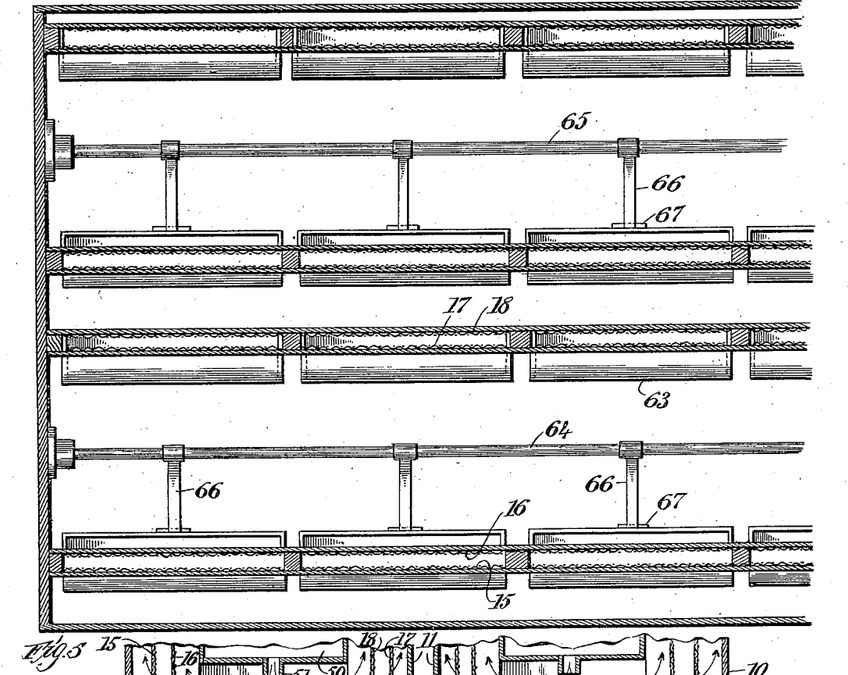
Fig. 5 is a section on the line 5 5 of Fig. 6.
Figure 6:
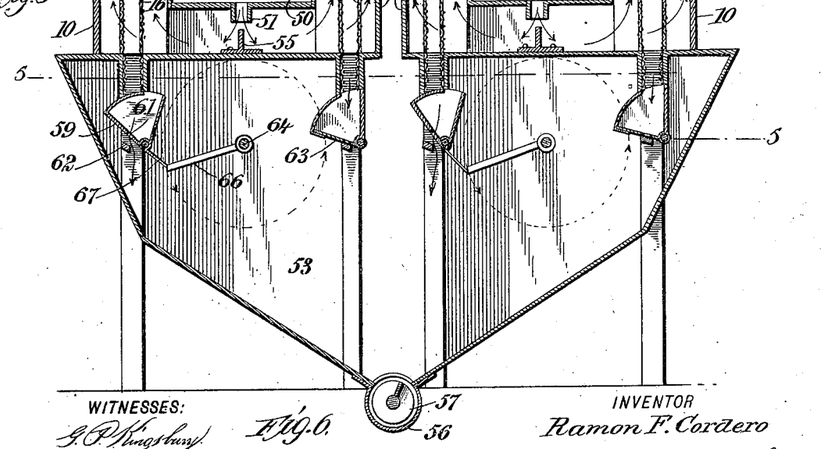
Fig. 6 is a transverse section of the lower portion of the drier.
Figure 7:
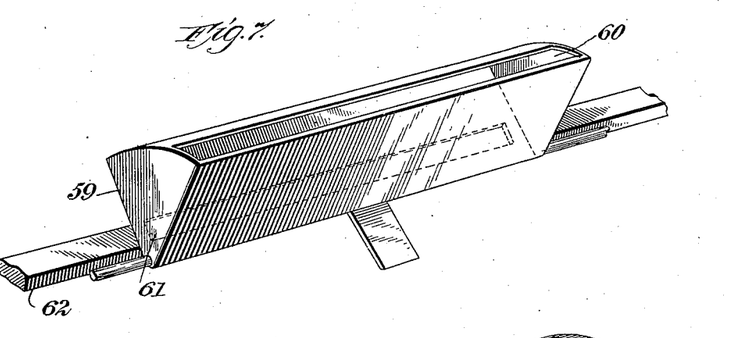
Figs. 7 and 8 are perspective views of receiving-troughs employed.
Figure 8:
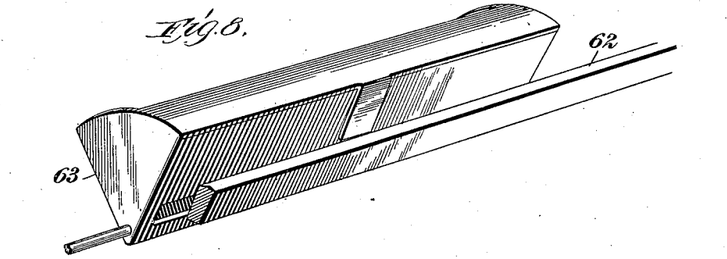

Arranged in the lower portion of each drying-chamber and lengthwise thereof is an air-conductor pipe 50, having openings or ports 51 at intervals, through which the air may be discharged against the top wall 52 of a receiving-hopper 53, and from this top wall 52 the air is deflected to the perforated walls, as indicated by the arrows in Fig. 2. The top wall of the conductor-pipe 50 is provided with downwardly-extended lugs or projections 54, designed to break up the air somewhat as it passes through the tube, and below the outlets or ports 51 is a deflecting-rib 55. It will be noted in Fig. 2 that the hopper is arranged for receiving material from two sections of the drier, and this material is directed by the inclined bottom wall to a receiver-tube 56, in which is a spiral conveyer 57, designed to carry the material lengthwise of the tube and cause its discharge through a spout 58.

Arranged underneath the space between the perforated walls 15 and 16 is a series of troughs 59, which are shown as V-shaped in cross-section, and each has an opening 60 at one side of its top, and a discharge-opening 61 is provided in one of the side walls, the said discharge-opening 61 being closed by a rail or bar 62, extended lengthwise in the hopper, said closing taking place, however, when the opening 60 is in line with the space between the walls 15 16. Similar receiving-troughs 63 are arranged underneath the space between the walls 17 18. Extended through the hopper underneath the section A is a shaft 64, and a similar shaft 65 extends through a portion of the hopper underneath the section B. On the shafts 64 65 are fingers 66, designed to engage with fingers 67, extended outward from the lower portions of the receiving-troughs at one side, and these fingers 66 are also designed to engage with the receiving-troughs at opposite sides to tilt the same.

On the outer end of the shaft 64 is a gear-wheel 68, and on the outer end of the shaft 65 is a gear-wheel 69. These gear-wheels are designed to be engaged one after the other, so as to impart a step-by-step rotary movement thereto in order to tilt the troughs by means of a lug or tooth 70, carried on the periphery of the band-wheel 45. It may be here stated that the conveyer 57 is rotated by means of a band 71, engaging with a pulley on the shaft of the band-wheel 45 and with a pulley 72 on the shaft of the conveyer.

The several air pipes or tubes 50 communicate with an air-pipe 73 through off set-pipes 74. This pipe 73 communicates with a trunk 75, on one side of which is a chimney 76, and also communicating with this trunk 75 is a cold-air pipe 77, and within the pipe 77 is a hot-air pipe 78, which also communicates with the interior of the trunk 75 and leads from a furnace or heater 79. Near the heater end the said pipe 77 communicates with a casing 80, into which air is forced by a blower or fan 81, and to prevent the cold air from striking suddenly against the hot-air pipe 78 and causing a warping or breaking I arrange a metal plate 82 underneath said hot-air pipe just above the opening for the inlet of cold air. The pipe 78 is supported at intervals by standards 83, and in the top wall of the casing 80 is a flue 84, provided with a damper 85, which will automatically open under certain pressures within the pipe 77 and permit the entrance of atmospheric air. Under a higher pressure, created by the fan 81, however, the said damper will be forced to closed position.

Figure 15:
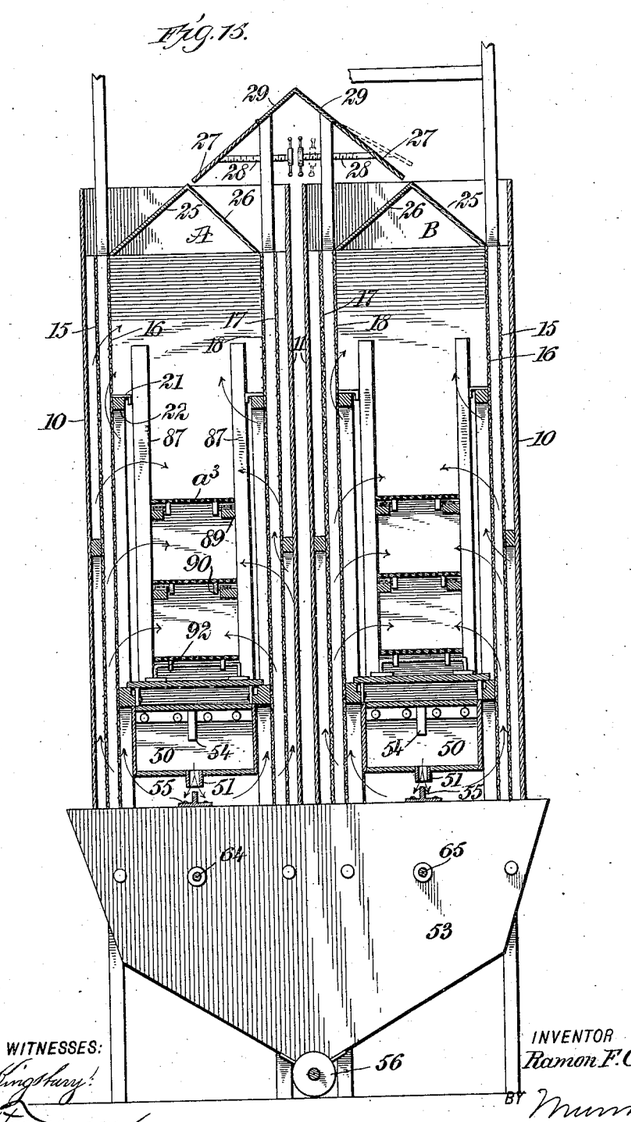

In the operation the mixed hot and cold air is forced through the pipes 77 78 and thence through the several ducts or passages 50, and this air, as before described, will circulate through the several perforated partitions and ultimately exhaust through the exhaust-pipes 86. At this time, of course, the material to be dried is passing down between the said perforated partitions and discharging into the troughs. As the shafts 64 65 rotate they will tilt the troughs having the fingers 67, causing the upper portions of the troughs to close the lower ends of the spaces between the perforated partitions and removing the openings 61 from the bars 62, thus permitting the coffee or other material to discharge into the hopper 53. The other troughs will likewise be engaged by the finger 66 and tilted to discharge material. For the purpose of drying fruit and the like I arrange in the driers frames for supporting shelves or trays $a^3$, as shown in Fig. 15. These frames may be of any suitable construction, but, as shown, each consists of uprights 87, a base-board 88, having rollers 92 mounted thereon, and longitudinal rails 89, upon which are mounted rollers 90.

It is to be understood that when the drier is used for drying fruit or the like the several plates 20 are to be removed. In drying fruit the circulation of air will be substantially as first described, excepting that by removing the plates 20 air is permitted to pass over and underneath the fruit or like material, and obviously the feeding device is not brought into use; neither are the discharging-troughs brought into use.

Having thus described my invention, claim as new and desire to secure by Letters Patent—

1. A drier comprising a casing, means for circulating air through said casing, a feeder-pipe extended lengthwise of the casing and above the same, the said feeder-pipe comprising a fixed semicircular section and a semicircular section having a rotary movement with relation to the first-named section, a hopper leading into said pipe, and means for causing the movements of the movable section at intervals of time.

2. A drier comprising a casing, spaced perforated walls arranged in the casing, an air pipe or tube extending along the lower portion of the casing, means for conducting air to said pipe or tube, said pipe or tube having communication with the space between the perforated walls, removable plates inward of the perforated walls, and means for discharging material between the perforated walls.

3. A drier comprising a casing, spaced perforated walls arranged in said casing at opposite sides, means for deflecting material to the space between adjacent perforated walls, an air-conductor extended through the lower portion of the casing and having outlets in its bottom wall, and lugs extended downward in said tube.

4. A drier comprising a casing, spaced perforated walls arranged in the casing at opposite sides and designed to receive material between them, means for directing air to said walls, rocking receiving-troughs arranged below the space between adjacent perforated walls, the said troughs having discharge-openings, and means for rocking the troughs at intervals of time for causing the discharge of material.

5. A drier comprising a casing, spaced perforated walls arranged in the casing at opposite sides, removable plates inward of said walls, an air-conductor pipe arranged along the lower portion of the casing and having openings in its bottom wall, a deflector-rib arranged below said openings, rocking troughs arranged below the space between the perforated walls, the said troughs having top portions for closing said space, and also having openings at the top near one side and openings through one of the side walls, bars for closing said side-wall openings, and means for rocking the troughs at intervals of time.

6. A drier comprising a casing, spaced perforated walls in the casing at opposite sides, inclined deflectors for directing material to the space between the walls, means for causing a circulation of air through the casing, a swinging deflector above the first-named deflectors, and means for discharging material to said swinging deflector at intervals of time.

7. A drier comprising a casing, spaced perforated walls in said casing at opposite sides, the outer perforated walls being spaced inward from the outer walls of the casing, rocking troughs at the lower end of the space between the perforated walls, means for causing the rocking movement of said troughs, a hopper in which the troughs are arranged, and a screw conveyer in the lower portion of the hopper.

8. A drier comprising a casing, means for causing a circulation of air through said casing, a feeder-tube extended along the upper portion of the casing and consisting of a fixed segmental section and a segmental section having a rotary movement with relation to the fixed section, weighted cords or cables having connection with the movable section, a shaft, fingers on said shaft for engaging with certain of the weights, and means for imparting motion to said shaft at intervals.

9. A drier comprising casings, spaced perforated walls in each casing, oppositely-inclined deflectors in each casing for discharging material into the spaces between adjacent perforated walls, swinging deflectors for directing material to the first-named deflectors, screws for regulating said swinging deflectors, and means for discharging material onto the swinging deflectors at intervals of time.

10. A drier comprising a casing, spaced perforated walls arranged in the casing at opposite sides, an air-conductor pipe extended along the lower portion of the casing and having openings for the discharge of air, a cold-air pipe arranged outward of the casing and communicating with said air-pipe in the casing, a hot-air pipe leading through the cold-air pipe and communicating with said pipe within the casing, means for forcing air into the cold-air pipe, and an automatic damper on said cold-air pipe.

11. A drier, comprising a drying-chamber, an air-conductor in the lower part of the chamber and communicating therewith, a heater, a hot-air pipe leading from the heater, a cold-air pipe surrounding the hot-air pipe, a trunk with which the cold-air pipe communicates, and a connection between the trunk and the air-conductor.

12. A drier, comprising a drying-chamber, an air-conductor in the lower part of the chamber and communicating therewith, a heater, a hot-air pipe leading from the heater, a cold-air pipe surrounding the hot-air pipe, a trunk with which the cold-air pipe communicates, a connection between the trunk and the air-conductor, and an air-forcing device connected with the cold-air pipe.

13. A drier, comprising a drying-chamber, an air-conductor in the lower portion of the drying-chamber and communicating therewith, a cold-air pipe, a connection between the cold-air pipe and the conductor, a heater, a casing interposed between the heater and cold-air pipe, a hot-air pipe leading from the heater and extending through the casing and cold-air pipe, an air-forcing device connected with the said casing, and an automatic damper for said casing.

14. A drier, comprising a drying-chamber, an air-conductor in the lower portion of the drying-chamber and communicating therewith, a cold-air pipe, a connection between the cold-air pipe and the conductor, a heater, a casing interposed between the heater and cold-air pipe, a hot-air pipe leading from the heater and extending through the casing and cold-air pipe, an air-forcing device connected with the casing, a flue on the said casing, and a valve in the flue and controlled by the pressure of air in the casing.

15. In a drier, a casing, an air-conductor extending lengthwise of the lower portion of the casing, said conductor being provided with a plurality of outlets in its bottom and with depending lugs on the inner face of its top, a deflector below the outlets of the conductor, and means for forcing air into the conductor.

16. In a drier, a casing, means for circulating air through the casing, a feeding-tube for delivering the material to the casing, said feeding-tube comprising segmental sections, one of which is stationary and the other mounted to rotate, and means for rotating the said section.

17. In a drier, a casing, means for circulating air through the casing, a feeder-tube receiving the material and discharging it into the casing, said tube comprising a fixed segmental section and a segmental section mounted to rotate, a feeding device in the feeder-tube, and means for operating the movable section of the feeder-tube from the feeding device.

18. In a drier, a casing, means for circulating air through the casing, a feeder-tube receiving the material and discharging it into the casing, said tube comprising two segmental sections, one of which is stationary and the other mounted to rotate, cords attached to the movable section of the feeder-tube and provided with weights at their ends, a spiral feeder in the feeder-tube, a shaft provided with a finger adapted to engage the weight of one of the said cords, and gearing between the said shaft and the shaft of the spiral feeder.

19. In a drier, a casing, means for circulating air through the casing, a feeder-tube receiving the material and discharging it into the casing, said feeder-tube comprising segmental sections, one of which is stationary and the other mounted to rotate, cords attached to the movable section of the feeder-tube and provided with weights at their ends, a spiral feeder in the feeder-tube and provided with a driven wheel having a single tooth, a shaft provided with a finger adapted to engage the weight of one of the said cords, and a gear-wheel on the said shaft and with which the tooth of the said wheel engages.

20. In a drier, a casing having a discharge-opening, a rocking trough below the discharge-opening of the casing, and having a discharge-opening in one side, means for rocking the trough, and means for closing the discharge-opening of the trough at the time the material is passing from the casing into the said trough.

21. In a drier, a casing having a discharge-opening at its bottom, a rocking V-shaped trough below the discharge-opening of the casing, and having an inlet-opening at one side of its top and a discharge-opening in one of its sides, means for rocking the trough, and means for closing the discharge-opening of the trough when the inlet-opening is in line with the discharge-opening of the casing.

22. In a drier, a casing having a discharge-opening at its bottom, a rocking V-shaped trough below the discharge-opening of the casing and having an inlet-opening at one side of its top and a discharge-opening in one of its sides, a revoluble shaft provided with a finger for engaging the trough to rock it, and means for closing the discharge-opening of the trough when its inlet-opening is in line with the discharge-opening of the casing.

23. In a drier, a casing having a discharge-opening at its bottom, a rocking V-shaped trough below the discharge-opening of the casing and having an inlet-opening at one side of its top and a discharge-opening in one side, said trough being also provided with a finger, a revoluble shaft provided with a finger for engaging the finger of the trough and also for engaging said trough, means for imparting intermittent movement to said shaft, and means for closing the discharge-opening of the trough when its inlet-opening is in line with the discharge of the casing.

24. In a drier, a casing having a discharge-opening in its bottom, a rocking V-shaped trough below the discharge-opening of the casing and having an inlet-opening in one side of its top and a discharge-opening in one side near the bottom, a revoluble shaft provided with a finger for engaging the trough to rock it and with a gear-wheel at one end, a driving-wheel provided with a tooth engaging the gear-wheel of the shaft having the finger, and means for closing the discharge-opening of the trough when the inlet-opening thereof is in line with the discharge-opening of the casing.

25. In a drier, a casing having a discharge-opening in its bottom, a rocking V-shaped trough arranged below the discharge-opening of the casing and having an inlet-opening at one side of its top and a discharge-opening in one side, means for rocking the trough, and a fixed bar arranged adjacent to the trough and adapted to close the discharge-opening thereof when its inlet-opening is in line with the discharge-opening of the casing.

In testimony whereof I have signed my name to this specification in the presence of two subscribing witnesses.

RAMÓN F. CORDERO.

Witnesses:
C. R. FERGUSON,
EDWARD B. MARSHALL.